United States Patent Office 2,890,485
Patented June 16, 1959

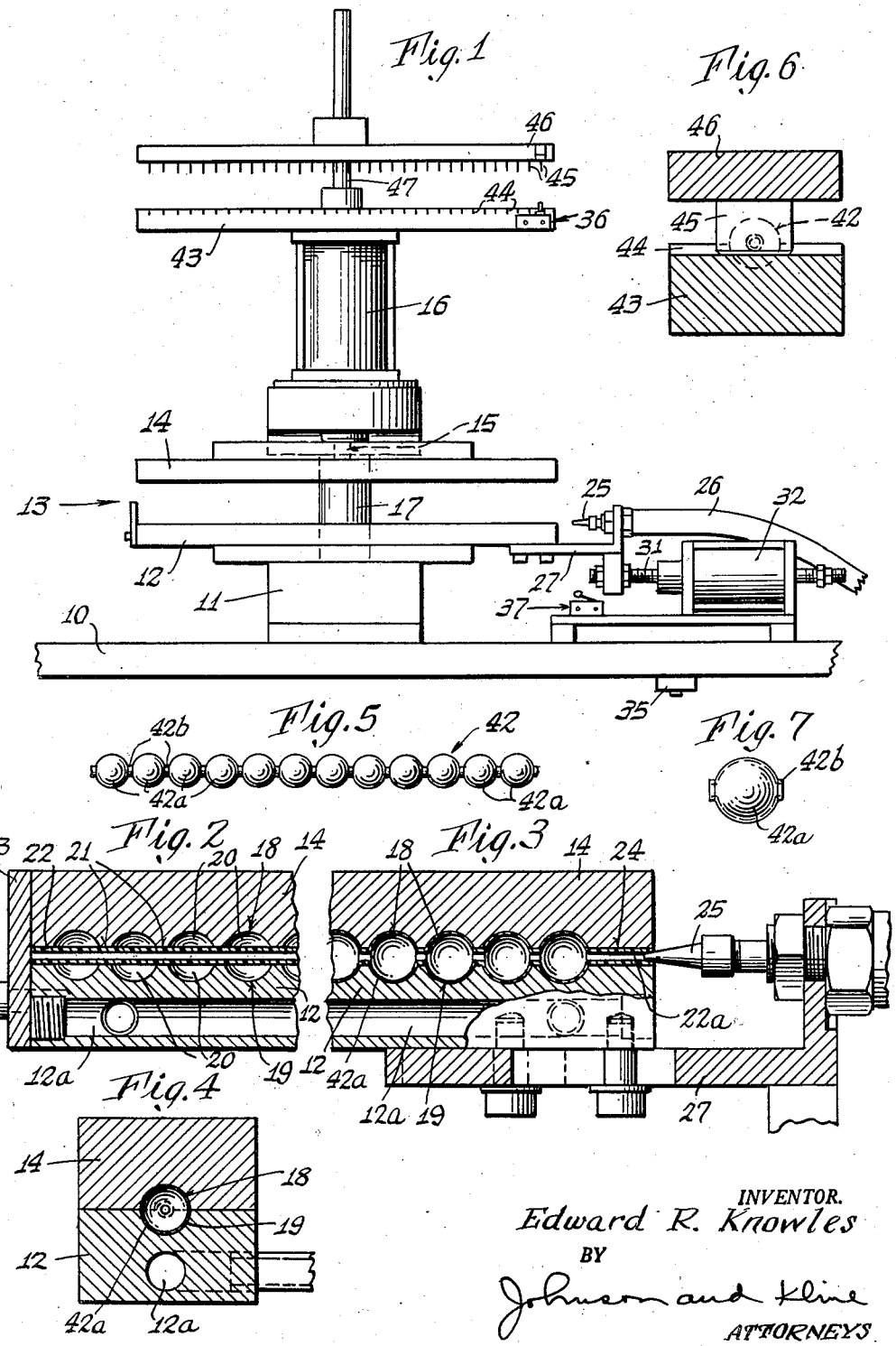

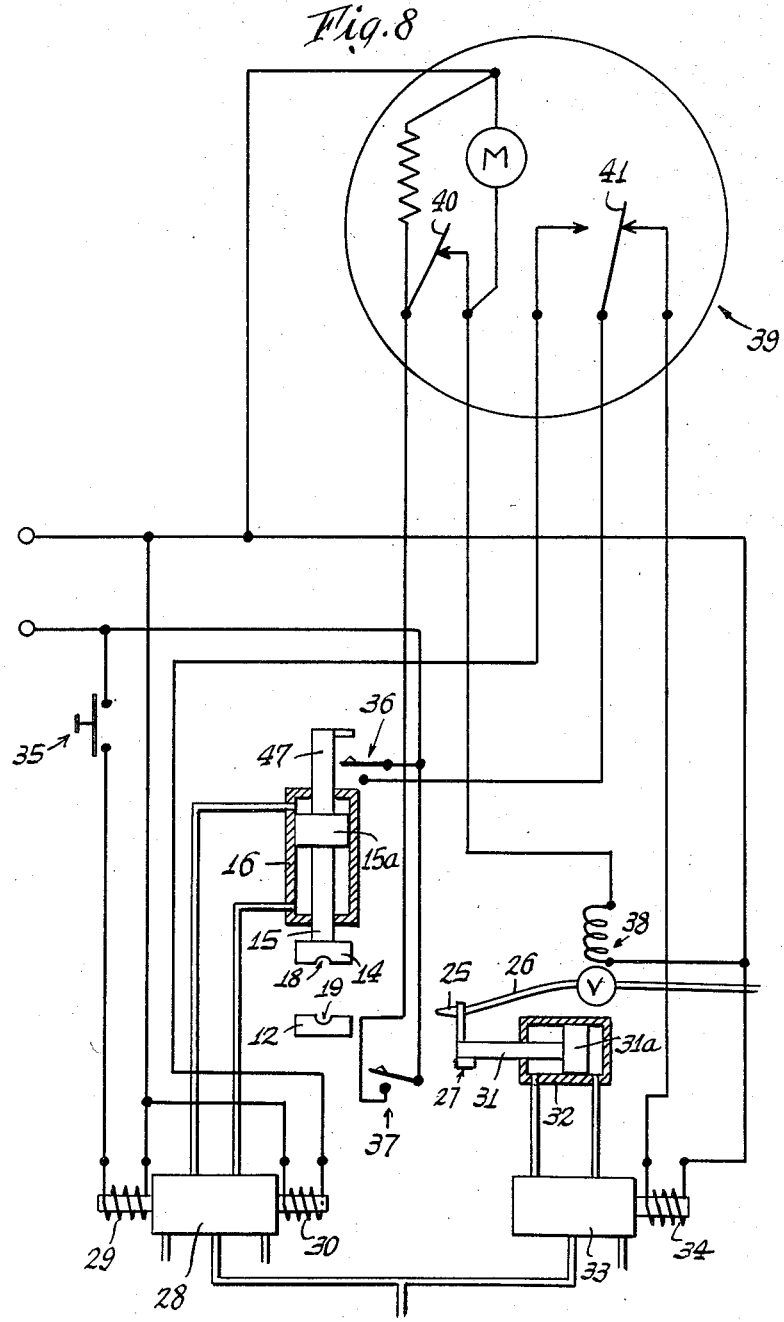

2,890,485

APPARATUS FOR MOLDING ARTICLES

Edward R. Knowles, Fairfield, Conn.

Application March 28, 1956, Serial No. 574,498

1 Claim. (Cl. 18—19)

The present invention relates to a novel apparatus for molding hollow articles and more particularly to simultaneously forming a plurality of hollow beads.

It is an object of the invention to provide an apparatus whereby the forming of hollow articles can be achieved quickly and at a relatively low cost.

It is another object of the invention to provide an apparatus which will automatically operate through a cycle to produce a molded article.

A more specific object of the invention is to provide a simplified molding apparatus capable of simultaneously forming a plurality of hollow beads from hollow plastic stock.

A feature of the invention resides in the formation of a plurality of beads in a "stick" and in the severing of a "stick" into the several beads as an incident to the molding of another stick of beads.

Another feature of the invention resides in the use of a hollow slug having an aperture formed therein and in inserting a nozzle through an aperture in the mold and into the aperture in the slug to supply fluid pressure to expand the slug in the cavity.

Other features and advantages of the invention will be apparent from the specification and claim when considered in connection with the drawings in which:

Figure 1 shows a front view of the apparatus with the mold parts in open position.

Fig. 2 is a longitudinal section through the mold parts with the hollow slug in position.

Fig. 3 is a longitudinal section through the mold parts during the molding operation.

Fig. 4 is a transverse section through the mold of Fig. 3.

Fig. 5 shows a stick of beads.

Fig. 6 shows a transverse sectional view of the cutters for separating the beads.

Fig. 7 shows a single bead.

Fig. 8 shows the control diagram.

As shown in the drawings the apparatus for forming the hollow articles comprises a frame or base 10 having a pedestal 11 mounted thereon to which is secured the lower part 12 of a two-part mold 13. The upper part 14 of the mold is carried by a piston rod 15 connected to piston 15a operating in a cylinder 16 supported on a post 17 carried by the base.

The mold parts 12, 14 are provided with cooperating cavities 18, 19 shaped to form the hollow plastic article from a hollow slug. While the article may have any shape, the present invention is particularly advantageous in the simultaneous formation of a plurality of hollow beads of any desired shape. This is accomplished by providing a plurality of bead-forming cavities 20 connected by constricted passageways 21. The hollow slug 22 is in the form of a tubular member of plastic material, such as polyethylene or the like moldable plastic material. Preferably, the slug is extruded and while still warm and soft is inserted in the mold. While the mold may be heated to provide articles having a frosted surface, it is preferred to use an unheated mold resulting in a minimum of time in the molding cycle and providing a shiny surface. Cooling fluid may be circulated in the passages 12a to maintain the mold at approximately room temperature. The slug is positioned so as to extend through the passages and cavities as shown in Fig. 2 with one end sealed by a plate 23, or by pinching or any suitable means and the other end disposed in an aperture 24 in the mold. The slug is expanded into engagement with the walls of the cavities by compressed air or other fluid introduced into the hollow slug preferably by means of a nozzle 25. The nozzle is connected to a hose 26 supplying air or fluid under pressure and is secured to a slide 27 mounted on the lower mold part for movement toward and away from the end of the mold to cause the nozzle to be inserted into the aperture in the mold and into the aperture or bore 22a in the hollow slug. Preferably the nozzle is tapered as shown in Figs. 1 and 3 so as to pinch the end of the slug against the walls of the aperture to seal the end of the slug. Fluid pressure is then supplied to expand the slug into engagement with the cavities to mold the stick of beads as shown in Fig. 5.

While the mold can be closed, the nozzle inserted, and the fluid molding pressure controlled by hand, it is at present preferred to perform these operations automatically. One means for accomplishing this automatic operation is shown in Fig. 8 wherein the cylinder 16 is controlled by a double solenoid actuated valve 28 having a pair of solenoids 29, 30 (Fig. 8) for controlling its operation to move the normally open upper mold part to and from closed position. Also, the slide 27 is connected to a piston rod 31 and piston 31a mounted in a cylinder 32 secured to the base 10 and controlled by a solenoid actuated valve 33 which is of the type that is normally spring urged to a position in which the slide and nozzle are in retracted position. The valve has a solenoid 34 for actuating it to cause the slide and nozzle to move to the inserted position of Fig. 3 where it remains for a predetermined time to permit molding of the stick of beads.

Preferably the cycle of operation is manually initiated and then is automatically performed. This is best understood from a consideration of Fig. 8 in which the control circuit is shown. To start the cycle, a slug is inserted into the cavity in the normally open mold and the push-button switch 35 is closed energizing solenoid 29 which moves the valve to the position to cause cylinder 16 to move the mold parts into closed position. When the mold is closed, a limit switch 36 is actuated energizing solenoid 34 of valve 33 and operating the valve to cause the cylinder 32 and piston 31a to move the nozzle into the bore in the slug. When the nozzle has reached its inserted position the slide engages limit switch 37 which energizes solenoid valve 38 in the hose line to cause fluid under pressure to be fed to the nozzle and the slug to expand the slug into engagement with the walls of the cavities. The limit switch 37 also closes the circuit to the motor M of a timer device 39. The timer device can be of any type such as an Eagle Signal Co. "Cycle-flex" timer, Model HP-30A6 or HP-20A6. After a predetermined time has elapsed sufficient to complete the molding operation, cam means (not shown) moves contact 40 to open the circuit to the solenoid of valve 38 whereby the valve shuts off the fluid pressure and vents the article. The contact 41 is also actuated to open the circuit to the solenoid 34 of valve 33 whereby said valve causes the slide to be withdrawn which opens the limit switch 37 and resets the timer 39 and the contact 41 also closes the circuit to solenoid 30 to shift the valve and cause the cylinder 16 and piston 15a to raise the mold part 14 and open the mold whereby the stick of beads can be removed. The stick of beads 42 comprises a plurality of beads 42a connected by short neck sections 42b.

The stick of hollow beads which is relatively light in weight can be utilized as such to form an ornament; however, it may be preferred to separate the beads into individual beads 42a as shown in Fig. 7. While the beads can be severed manually, the present invention provides means to facilitate this operation. As shown in Fig. 1, a holder 43 having bead-receiving cavities similar to those in mold part 12 is mounted on the cylinder 16 and is provided with slits 44 extending through the portions between the beads to receive cutting knives 45 carried by a carrier 46 mounted on piston rod 47 connected to piston 15a projecting from the end of the cylinder 16. With this arrangement, a stick of beads is inserted in the holder 43 at the same time that a slug is inserted in the open mold. As the mold is closed, the cutting knives will move into the slits 44 and sever the neck sections 42b between the beads. When the mold is opened at the end of the cycle, the severed beads can be impaled on a long needle and removed from the holder whereupon the stick from the mold can be inserted in the holder.

Thus it will be seen that the formation of beads can be quickly and accurately formed with a minimum of handling operations rendering the production of the beads relatively inexpensive.

Variations and modifications may be made within the scope of the claim and portions of the improvements may be used without others.

I claim:

A device for molding a plurality of hollow beads comprising a frame having mounted thereon a normally open, longitudinally split mold having a plurality of bead-forming cavities therein connected by constricted passageways adapted to form a stick of spaced hollow beads and having an aperture connecting with one of said cavities, said mold parts being adapted to receive a tubular slug disposed in the cavities and passageways with one end of the bore in alignment with the aperture in the mold and the other end sealed in the mold; piston and cylinder means for moving said mold parts to close the mold; nozzle means; means for moving said nozzle means into the aperture in the mold and into communication with the bore in the slug; means for supplying fluid under pressure through said nozzle to said tubular slug to expand said slug to conform to the shape of the cavities to form a plurality of connected hollow beads thereon; means for relieving said pressure and removing said nozzle; means actuating the means for moving the mold parts to open the mold; a support for holding a stick of beads mounted on the frame; and a carrier having a plurality of knives thereon connected to the piston to sever a stick of beads on the support between each bead when the piston closes the mold.

References Cited in the file of this patent

UNITED STATES PATENTS

| | | |
|---|---|---|
| 1,052,081 | Miltner | Feb. 4, 1913 |
| 1,984,697 | Person | Dec. 18, 1934 |
| 2,167,392 | McDonald | July 25, 1939 |
| 2,515,093 | Mills | July 11, 1950 |
| 2,750,624 | Coates et al. | June 19, 1956 |
| 2,787,023 | Hagen et al. | Apr. 2, 1957 |

FOREIGN PATENTS

| | | |
|---|---|---|
| 15,868 | Great Britain | Oct. 7, 1890 |